(12) United States Patent
Power et al.

(10) Patent No.: US 7,381,026 B1
(45) Date of Patent: Jun. 3, 2008

(54) MAIL TRAYING APPARATUS

(76) Inventors: Troy Robert Power, 4720 Pawnee St., Lincoln, NE (US) 68506; Thomas Patrick Moylan, 260 N. 202nd St., Eagle, NE (US) 68347; Steven Fredric Olson, 14029 Washington St., Omaha, NE (US) 68137; Kyle William Lennard, 4008 Cheyenne St., Elkhorn, NE (US) 68022

( * ) Notice: Subject to any disclaimer, the term of this patent is extended or adjusted under 35 U.S.C. 154(b) by 217 days.

(21) Appl. No.: 11/315,791

(22) Filed: Dec. 22, 2005

(51) Int. Cl.
*B65G 59/10* (2006.01)

(52) U.S. Cl. ............... 414/795.6; 414/797; 414/790.6; 414/790.2; 414/912

(58) Field of Classification Search ............... 414/797, 414/795.6, 293, 304, 305, 324, 332, 403, 414/418–422, 431, 222.04–222.12, 225.01, 414/226.02, 226.03, 226.05, 178, 181–184, 414/186, 192, 208, 790.2, 790.6, 265, 796.9, 414/912; 294/68.1, 68.2, 68.26, 68.27, 3, 294/2; 271/124; 53/473, 475; 700/213, 700/218, 219; 270/58.18, 58.19; 209/617, 209/903, 583, 584, 900
See application file for complete search history.

(56) References Cited

U.S. PATENT DOCUMENTS

| 4,541,763 | A | * | 9/1985 | Chandhoke et al. | ........ 414/790 |
| 5,330,311 | A | * | 7/1994 | Cawley et al. | ......... 414/416.01 |
| 6,896,471 | B2 | | 5/2005 | Svyatsky et al. | ........... 414/421 |
| 2003/0120387 | A1 | * | 6/2003 | Sherwin | ..................... 700/245 |

* cited by examiner

*Primary Examiner*—Saul J. Rodriguez
*Assistant Examiner*—Gregory W Adams
(74) *Attorney, Agent, or Firm*—Thomte Law Office; Dennis L. Thomte

(57) ABSTRACT

A mail traying apparatus which trays or sweeps mail envelopes, which are positioned in a mail stacker bin, into a mail tray and to deliver the same to an outbound conveyor or cart. The apparatus includes a robot having a robot arm mounted thereon with the robot arm having a mail tray support at the tool end thereof. The robot moves the robot arm to a source of empty mail trays so that an empty mail tray may be positioned in the mail tray support. The robot then moves the empty tray to the discharge end of the mail stacker bin, sweeps the mail into the mail tray, and then moves the filled mail tray to an outbound conveyor or cart.

21 Claims, 20 Drawing Sheets

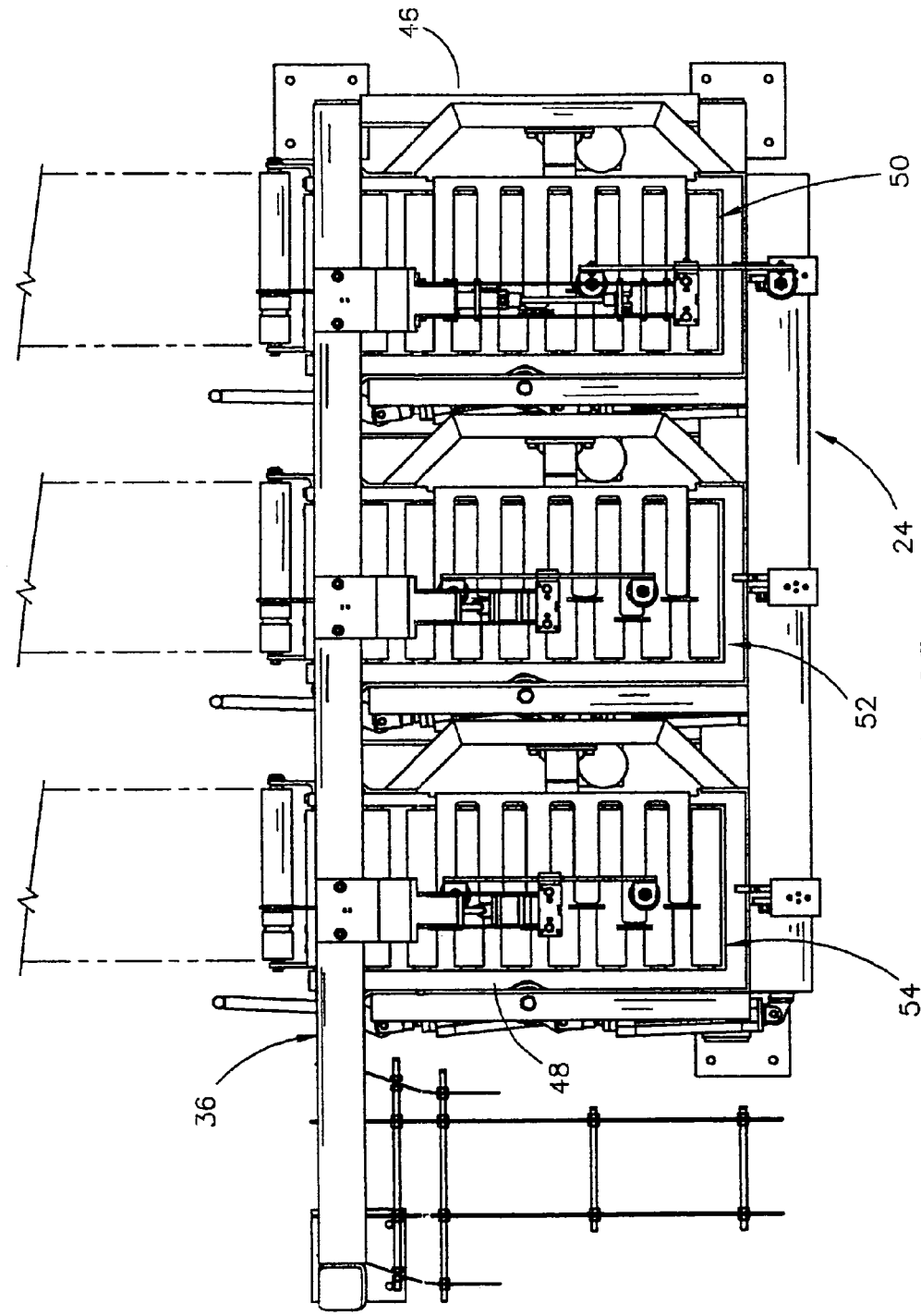

MAIL TRAYING APPARATUS

BACKGROUND OF THE INVENTION

1. Field of the Invention

This invention relates to a mail traying apparatus and more particularly to a mail traying apparatus which trays or sweeps mail envelopes, which are positioned in a mail stacker bin, into a mail tray and to deliver the same to an outbound conveyor or cart.

2. Description of the Related Art

In many prior art mail processing systems, completed envelopes are collated and delivered into a stationary mail stacker bin. It is believed that in most, if not all, prior art systems, it is necessary to manually transfer the stacked envelopes from the mail stacker bin into an empty mail tray and then manually transfer the filled mail tray to an outbound conveyor system. Such a process involving manual labor is time-consuming and costly.

SUMMARY OF THE INVENTION

A method of processing mail envelopes is disclosed which comprises the steps of:
 (a) providing a conventional mail processing machine including a mail stacker bin, having infeed and discharge ends, into which mail envelopes are placed in an upstanding position so as to be standing on edge;
 (b) positioning a source of empty mail trays remote from the mail stacker bin;
 (c) providing a robot including a movable robot arm having a mail tray support and mail sweeper secured to the tip or tool end thereof;
 (d) positioning the robot relative to the mail stacker bin and the source of empty mail trays so that the mail tray support and mail sweeper may be moved therebetween;
 (e) causing the robot arm to move to the source of empty mail trays and to position an empty mail tray in the mail tray support;
 (f) moving the robot arm so that the empty mail tray in the mail tray support is positioned below the stacker bin at the discharge end thereof;
 (g) moving the mail tray support and the mail sweeper so as to sweep the mail envelopes in the mail stacker bin into the mail tray positioned in the mail tray support;
 (h) moving the robot arm and the filled mail tray to a mail tray discharge area; and
 (i) removing the filled mail tray from the mail tray support.

The apparatus of this invention comprises a robot including a movable robot arm with a mail tray support and mail sweeper mounted on the tip or tool end of the robot arm. The mail tray support is adapted to have a mail tray supported or positioned thereon or therein. The robot is adapted to move the robot arm and the mail tray support to a position adjacent the discharge end of the mail stacker bin, whereby the mail sweeper may sweep the mail envelopes into the stacker bin into the mail tray positioned on the mail tray support as the mail tray support is moved with respect to the mail stacker bin.

It is therefore a principal object of the invention to provide an improved mail traying system.

A further object of the invention is to provide a mail traying apparatus which eliminates the need for a person to manually transfer envelopes from a mail stacker bin of a mail processing machine into a mail tray and then to manually move the filled mail tray to an outbound conveyor or cart.

Yet another object of the invention is to provide a mail traying apparatus including a robot and a robotic arm having a mail tray support and mail sweeper mechanism movably positioned thereon.

A further object of the invention is to provide a mail traying apparatus which may retrieve empty mail trays from one or more sources of empty mail trays and to position a mail tray adjacent one of many mail stacker bins and to then sweep the mail in the mail stacker bin into the mail tray and to then move the filled mail tray to an outbound conveyor or cart.

These and other objects will be apparent to those skilled in the art.

BRIEF DESCRIPTION OF THE DRAWINGS

FIG. 23 is a top view of a denester apparatus which may be used with the mail traying apparatus of this invention;

DETAILED DESCRIPTION OF THE INVENTION

Figure 1:
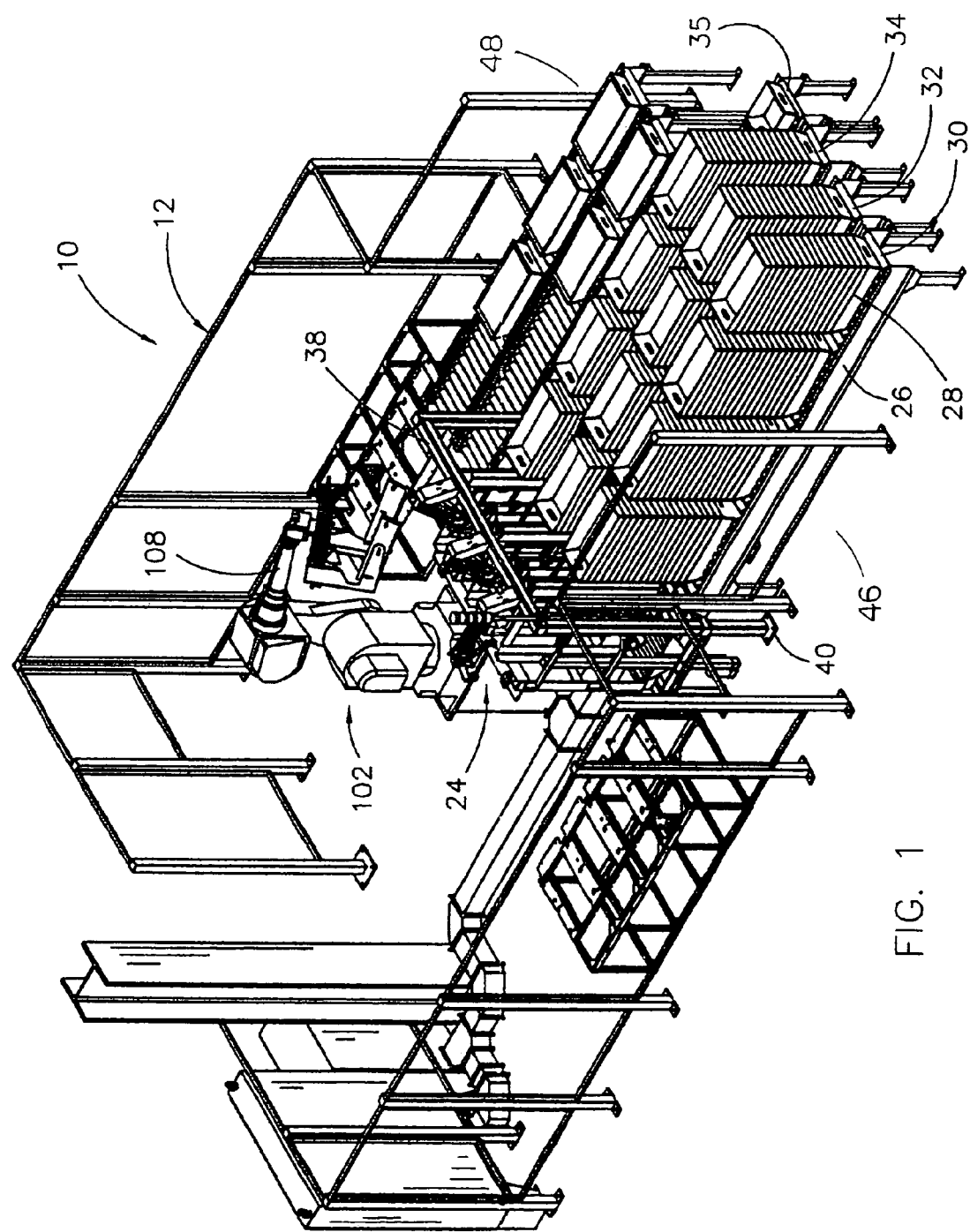
FIG. 1 is a partial perspective view of the mail traying apparatus of this invention.
Figure 2:
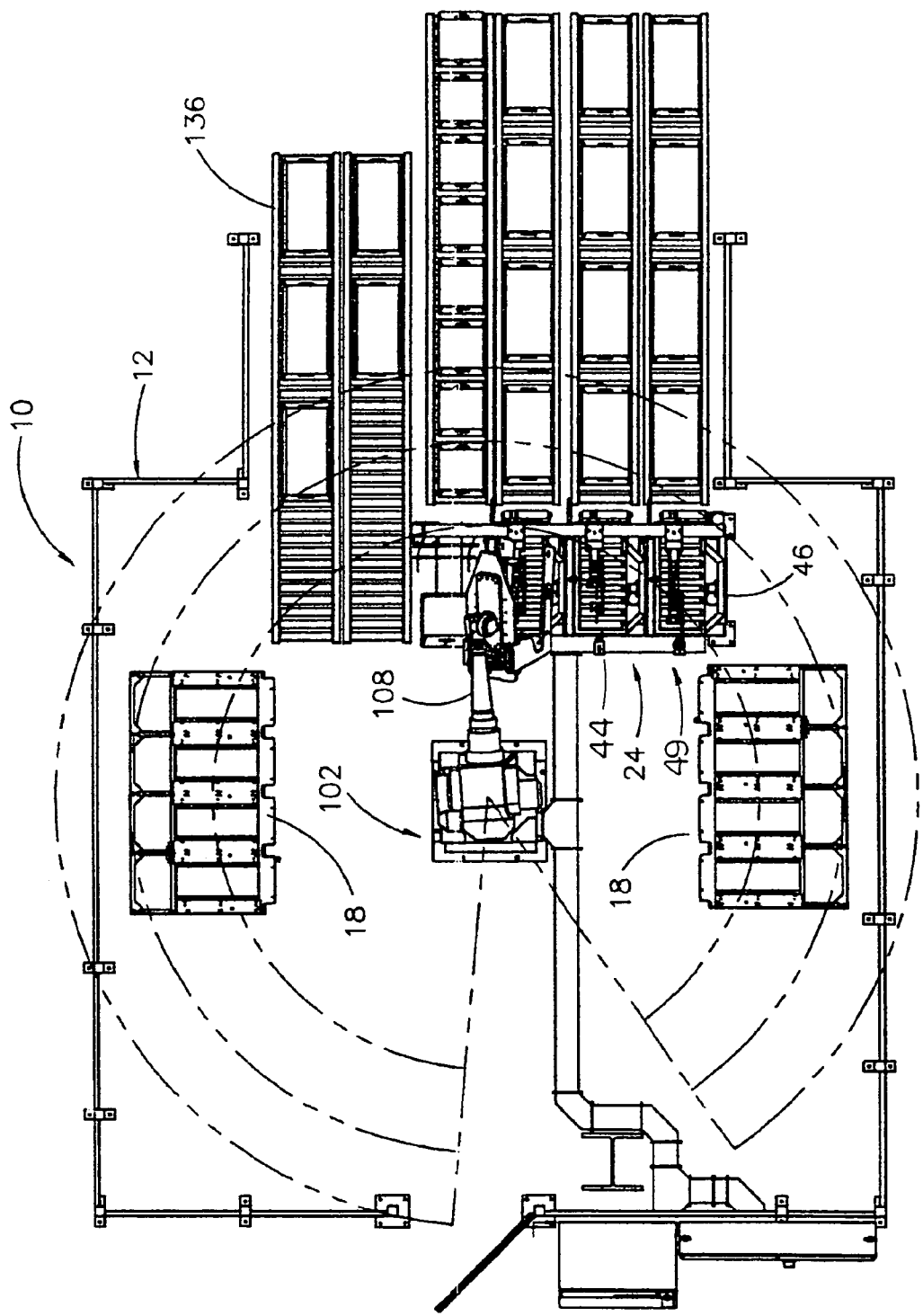
FIG. 2 is a top view of the mail traying apparatus of this invention.
Figure 3:
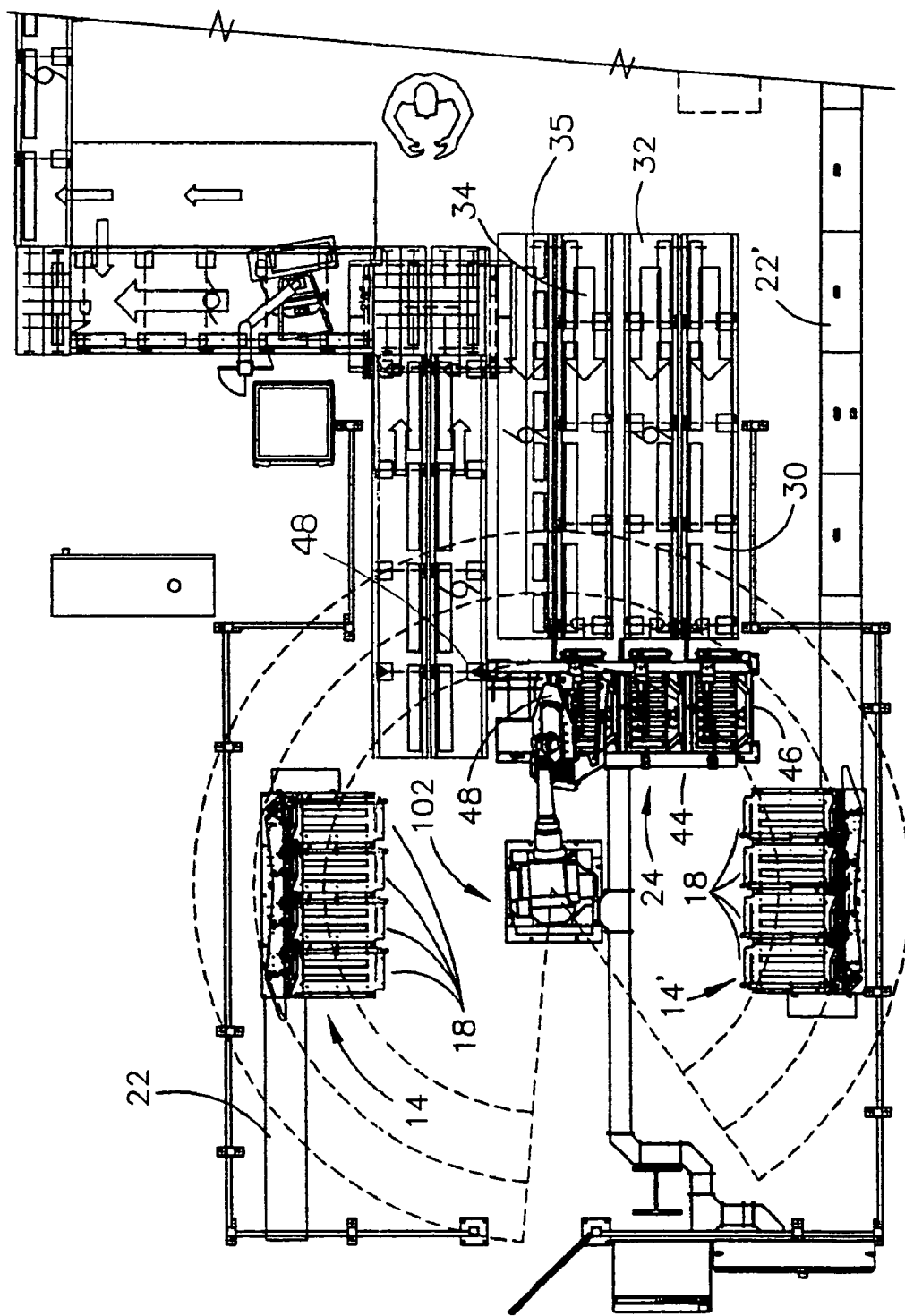
FIG. 3 is a top view of the mail traying apparatus with the arrows indicating the flow of mail trays.
Figure 4:
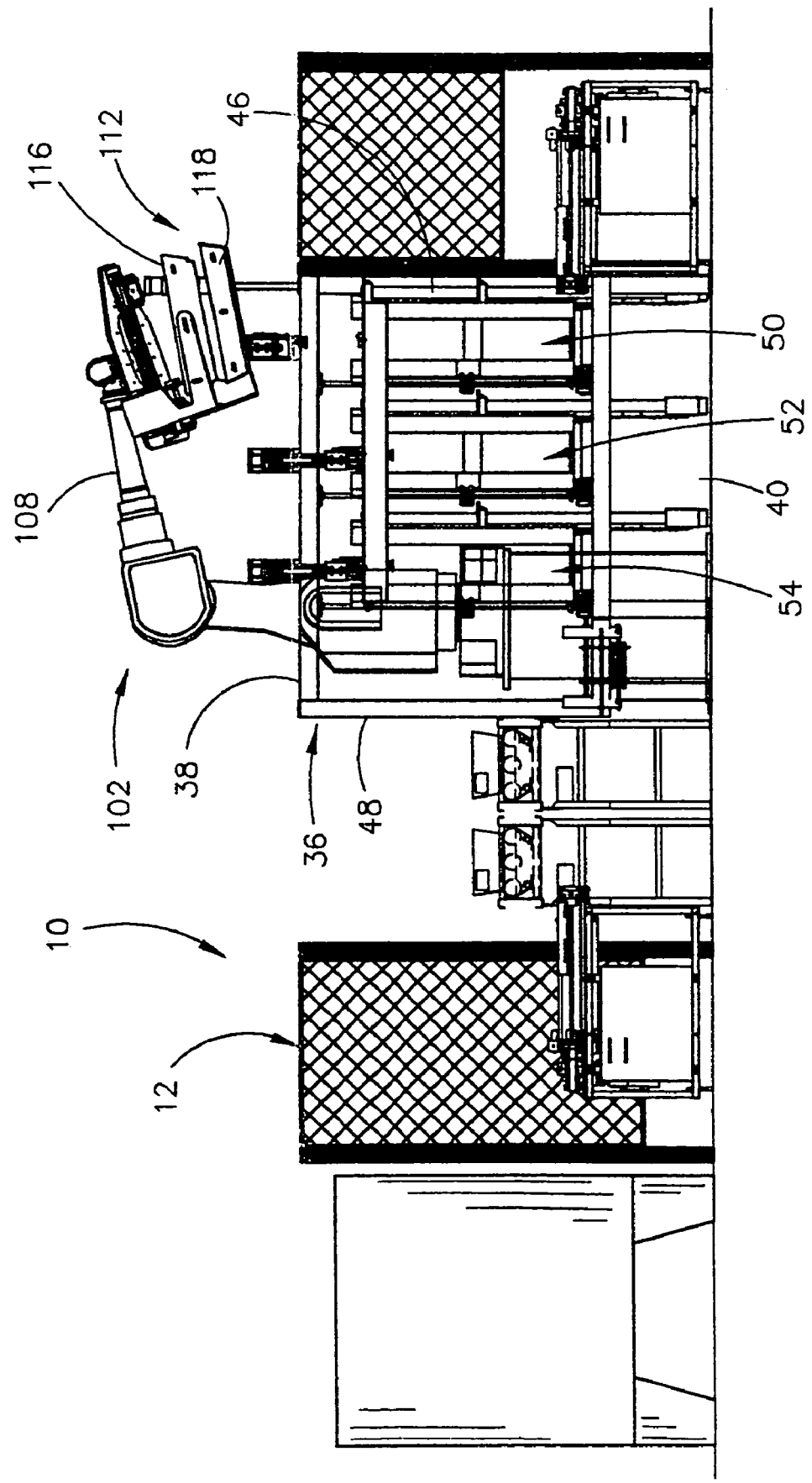
FIG. 4 is a partial front view of the mail traying apparatus.
Figure 5:
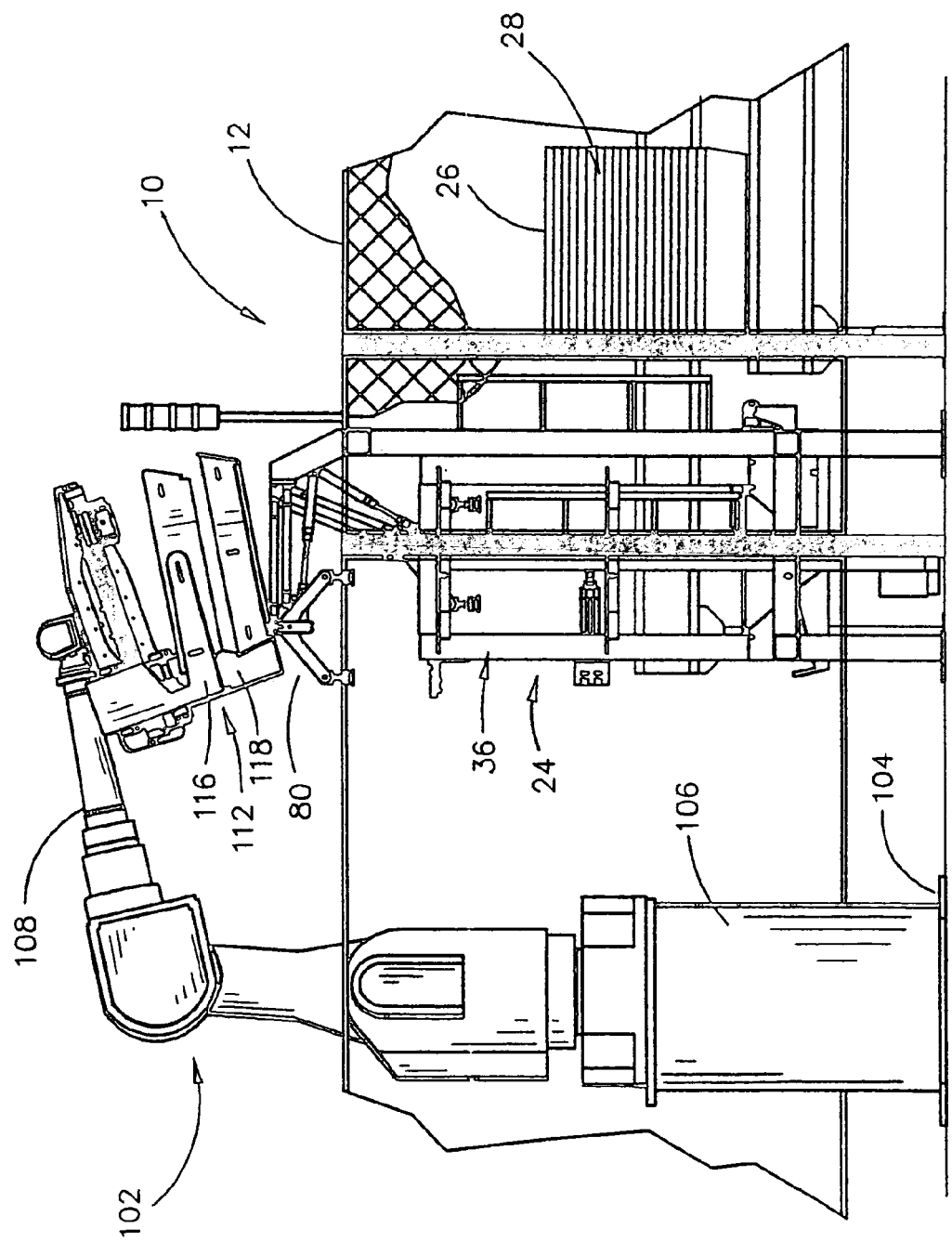
FIG. 5 is a partial side view of the mail traying apparatus.
Figure 6:
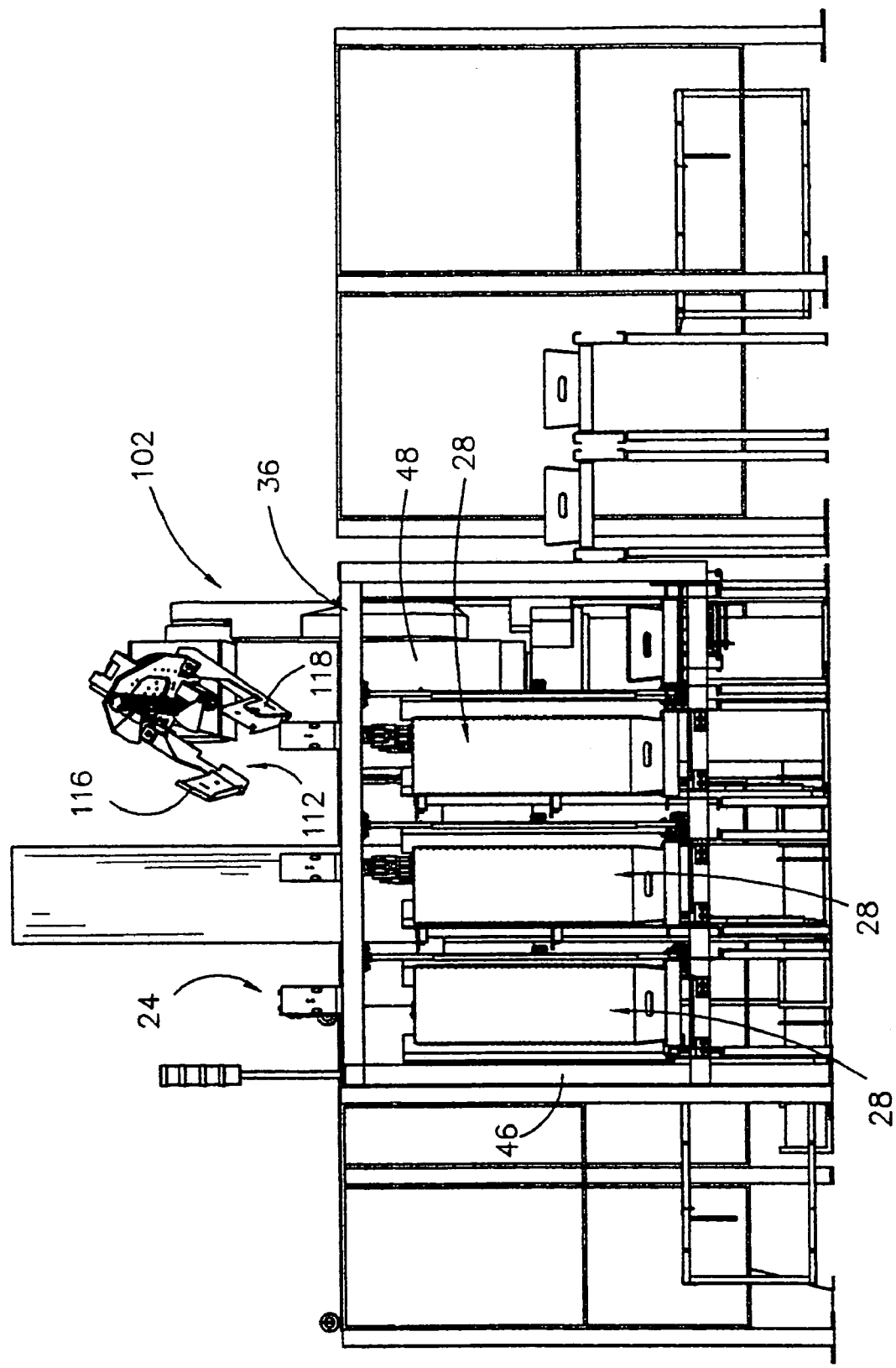
FIG. 6 is a partial rear view of the mail traying apparatus.
Figure 7:
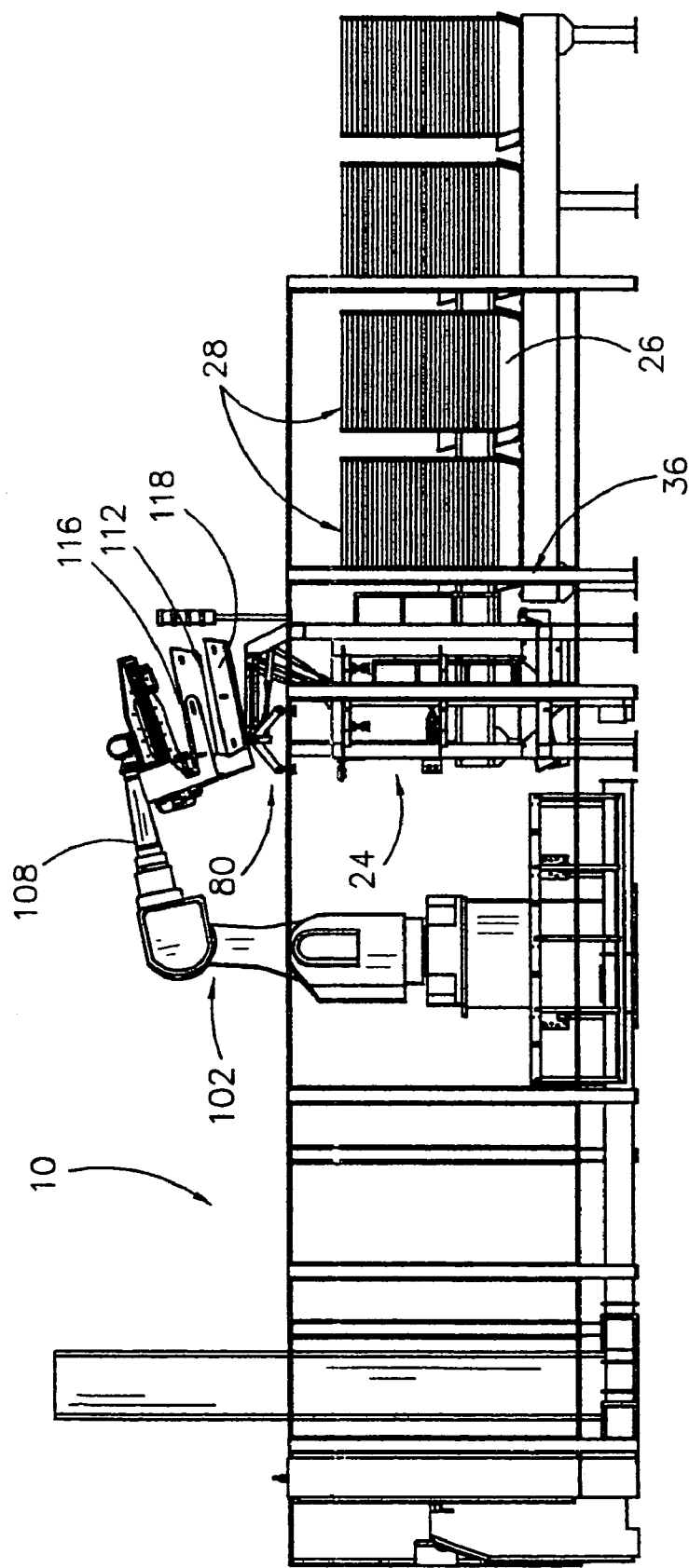
FIG. 7 is a partial side view of the mail traying apparatus.
Figure 12:
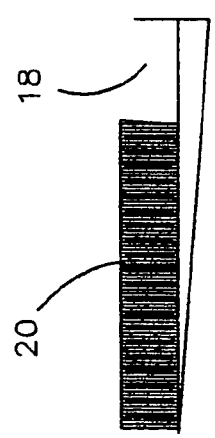
FIGS. 12-22 are side schematic views illustrating the manner in which the envelopes in a mail stacker bin are swept into a mail tray.
Figure 13:
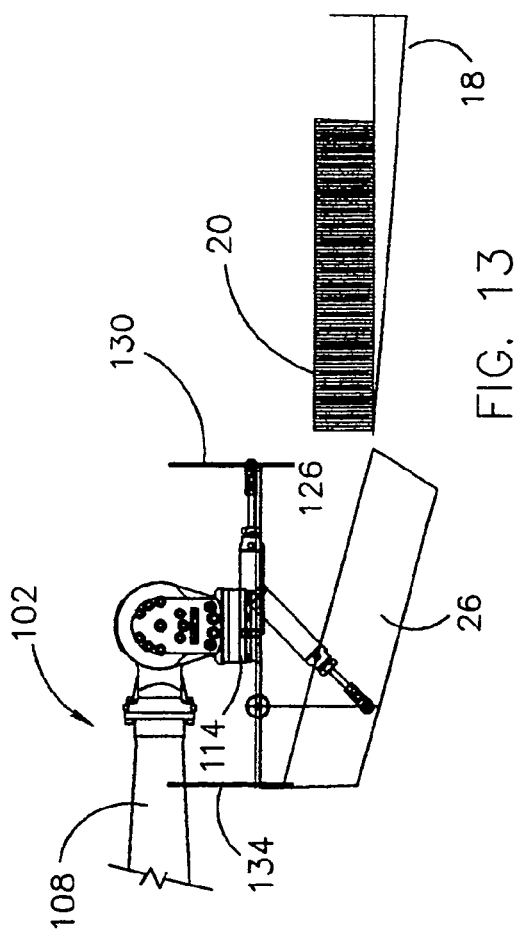

In FIG. 1, the mail traying subsystem (MTS) or apparatus of this invention is referred to by the reference numeral 10. MTS 10 includes an enclosure 12 which extends around most of the components thereof for safety purposes. MTS 10 also includes two conventional mail processing machines 14 and 14' (FIG. 3), each of which collates filled mail envelopes in a collator and feeds the same into a plurality of mail stacking bins 18 which are supported above the floor of the enclosure 12. The mail envelopes 20 are stacked in the stacking bins 18 so as to be standing on edge (FIG. 12). Preferably, the machines 14 and 14' are positioned in the enclosure 12, as depicted in FIG. 1. Although FIG. 1 illustrates that a pair of mail processing machines 14 and 14' are utilized, a single mail processing machine may be used. Conveyors 22 and 22' feed the mail envelopes to the machines 14 and 14', respectively (FIG. 3).

MTS 10 also preferably includes a mail tray denester 24 which denests empty mail trays 26 from stack 28 of mail trays supplied to the denester 24 by means of conveyors 30, 32 and 34. Conveyor 35 may also be utilized in the system to supply individual trays to the system, but conveyor 35 does not form a part of the denester 24. Denester 24 is provided with an upstanding frame 36 having an upper end 38, lower end 40, an open rearward side 42, a forward side 44, and opposite sides 46, 48. Frame 36 defines a plurality of cells 50, 52 and 54, each of which is adapted to receive a stack 28 of mail trays 26 therein. Although three cells are illustrated, any number of cells may be utilized. Inasmuch as each of the cells 50, 52 and 54 are identical, only cell 50 will be described in detail.

Cell 50 has a bottom portion 56 which has a plurality of rollers 58 rotatably mounted therein. Cell 50 includes a stack lift mechanism 60 having an elevator 62 which is vertically movable between a lower position to an upper position by means of an electrically driven motor 64 which operates a threaded screw actuator positioned within tube 66. Elevator 62 is operatively connected to the screw actuator for vertical movement in conventional fashion. Elevator 62 has a plurality of elongated openings or slots 68 formed therein which permit the rollers 58 to extend upwardly therethrough when elevator 62 is in its lower position so that a stack 28 of trays 26 may roll into the cell 50 from the conveyor 30. Each of the cells 50, 52 and 54 is provided with a pneumatic cylinder 70 which drives or operates a rotatable paddle 72 connected thereto which engages the rearward side of a stack 28 within the cell to pull the stack to the forward side of the cell. Each of the cells 50, 52 and 54 are also provided with a second pneumatic cylinder 70' which drives or operates a rotatable paddle 72' connected thereto which engages the rearward side of a stack 28 within the cell to pull the stack to the forward side of the cell. The cylinders 70, 70' and the paddles 72, 72' permit the cell to accommodate different lengths of mail trays.

The numeral 74 refers to a mail tray sensing and retaining mechanism provided at the top of the cell 50 and which has an upper retractable sensing pin 76 and a lower retractable tray engagement pin 78 movably mounted thereon. Pins 76 and 78 are preferably individually pneumatically driven between extended and retracted positions. When upper pin 76 is extended, lower pin 78 is retracted. When upper pin 76 is retracted, lower pin 78 is extended. The operation of mechanism 74 will be described in more detail hereinafter.

Figure 30:
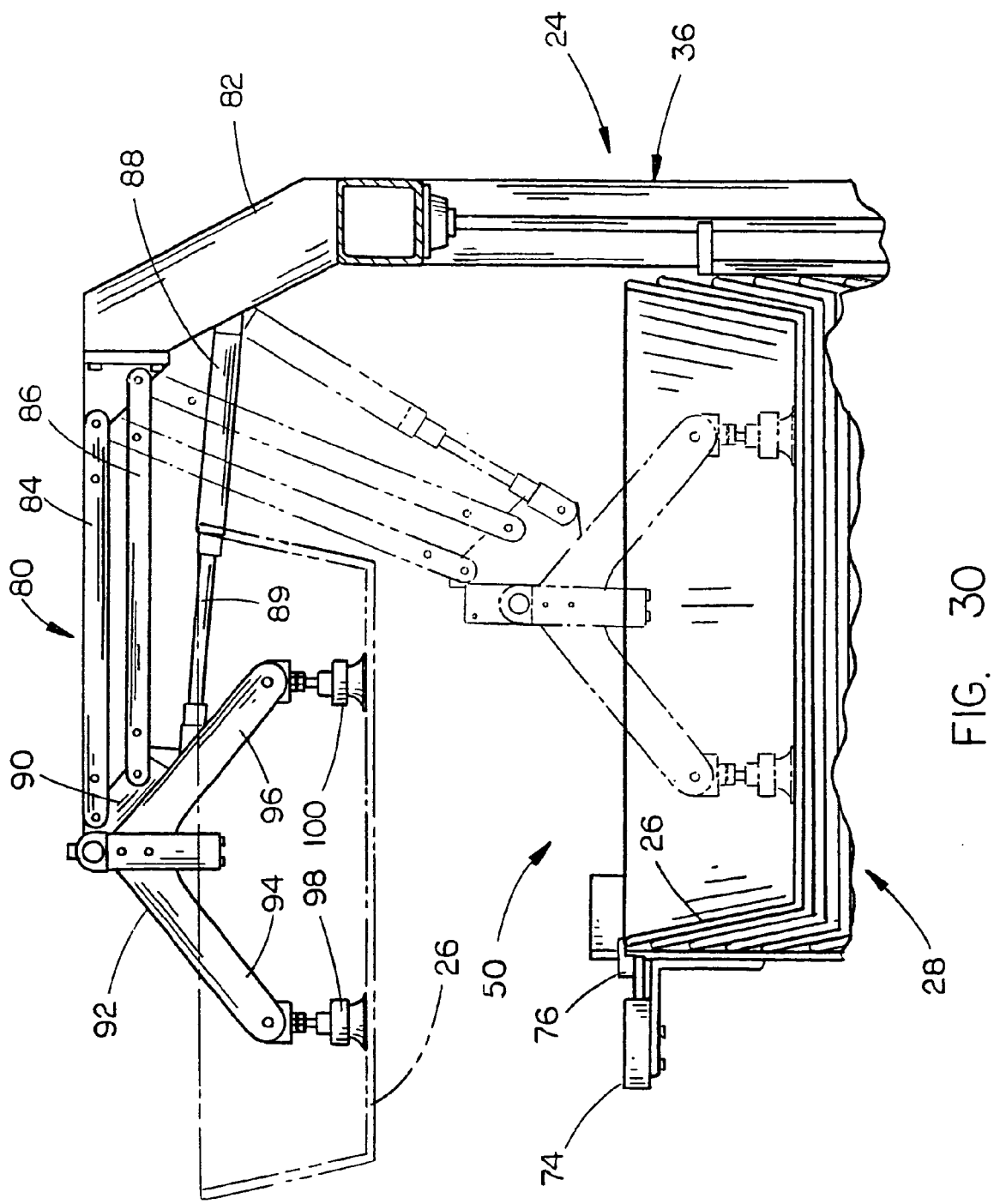
FIG. 30 is a partial side view of the denester apparatus illustrating the manner in which the uppermost mail tray is lifted from the stack of mail trays in the denester apparatus.

A mail tray denester 80 is mounted at the upper end of frame 36 above cell 50. Denester 80 includes a bracket 82 which extends upwardly from frame 36 and which has the rearward ends of parallel arms 84, 86 pivotally connected thereto, as seen in FIG. 30. The base end (rearward) of pneumatic cylinder 88 is also pivotally connected to bracket 82, as seen in FIG. 30. The forward ends of arms 84, 86 and the rod 89 of cylinder 88 are pivotally connected to mount 90 which has yoke 92 secured thereto with the legs 94 and 96 of yoke 92 extending downwardly therefrom in a diverging relationship. Vacuum lift cups 98 and 100 are pivotally connected to the lower ends of legs 94 and 96, respectively, and are in communication with a source of vacuum pressure and compressed air in conventional fashion. When vacuum pressure is applied to the lift cups 98 and 100 and the cups 98 and 100 are in engagement with an empty mail tray, the mail tray will adhere thereto (FIG. 30). When the vacuum pressure is discontinued to the cups 98 and 100 and compressed air is delivered thereto, the cups 98 and 100 will release the mail tray.

The denester 24 is operated in the following manner. Inasmuch as each of cells 50, 52 and 54 function in the same manner, only the operation of cell 50 will be described in detail. Stack 28 of empty mail trays 26 is placed on the conveyor 30 with the conveyor being operated to supply the stack 28 to cell 50. The stack lift mechanism 60 will have positioned the elevator 62 in its lowermost position prior to the stack 28 arriving at the open rearward end of the cell 50. The stack 28 enters the rearward end of the cell 50 and rolls upon the exposed rollers 58 towards the forward end of the cell. The cylinder 70 is operated to bring the paddle 72 connected thereto into engagement with the rearward side of the stack 28 to move the stack 28 to the forward end of the cell regardless of the length of the trays in the stack.

The motor 64 is then activated to cause the stack 28 on the elevator 62 to be raised until the edge of the uppermost mail tray 26 in the stack engages the underside of the extended pin 76 of the sensing and retainer mechanism 74 (FIG. 30).

Figure 29:
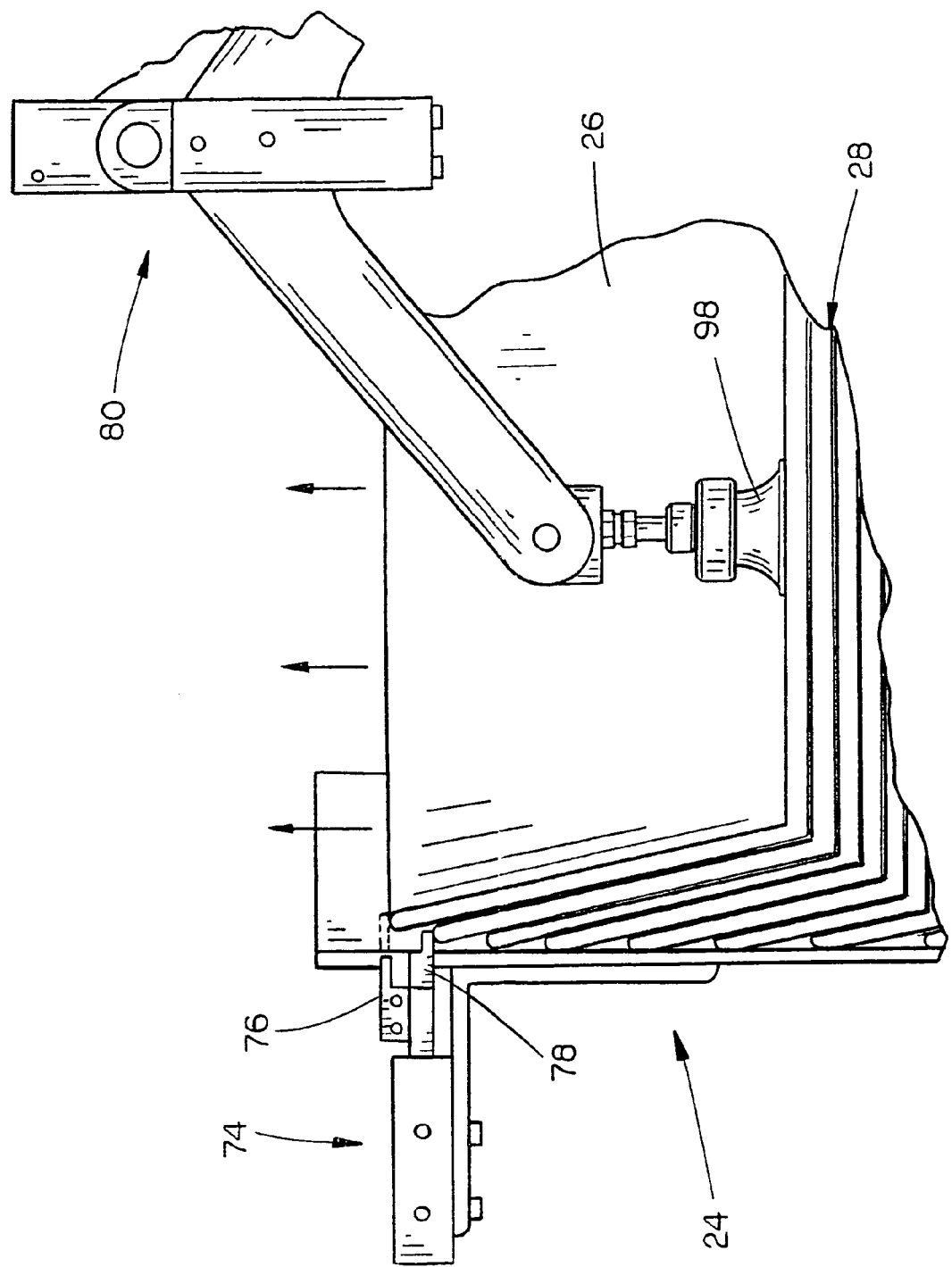
FIG. 29 is a partial side view illustrating the denester apparatus in its relationship to stacked empty mail trays.

The uppermost tray 26 in the stack is able to move past the lower pin 78 since it is retracted at this time (FIG. 30). When the uppermost tray engages the extended upper pin 76, the motor 64 is automatically deactivated. The upper pin 76 retracts and the lower pin 78 extends so that it extends over the upper edge of the mail tray immediately beneath the uppermost tray in the stack 28 (FIG. 29).

The mail tray denester 80 is then activated to cause the yoke 92 to be moved downwardly from its raised position to its lowered position (FIG. 29) so that the cups 98 and 100 are brought into engagement with the inside surface of the bottom of the uppermost tray. Vacuum pressure is supplied to the cups 98 and 100 so that the cups 98 and 100 adhere to the tray. The cylinder 88 is then extended to raise the yoke 92, the cups 98 and 100, and the mail tray to a raised position above the remaining trays in the stack (FIG. 30). As the uppermost mail tray is raised from the stack, the positioning of the lower pin 78 above the edge of the mail tray immediately beneath the uppermost tray prevents upward movement of the remaining trays in the stacks as the uppermost tray is removed or denested from the stack.

The mail tray attached to the cups 98 and 100 is then held in position for removal therefrom by the robot arm which will be described hereinafter. Although the denester apparatus of this invention is ideally suited for use with the robot to be described hereinafter, the denester apparatus may be used with other types of mail tray pick-up or mail tray handling devices.

Figure 8:
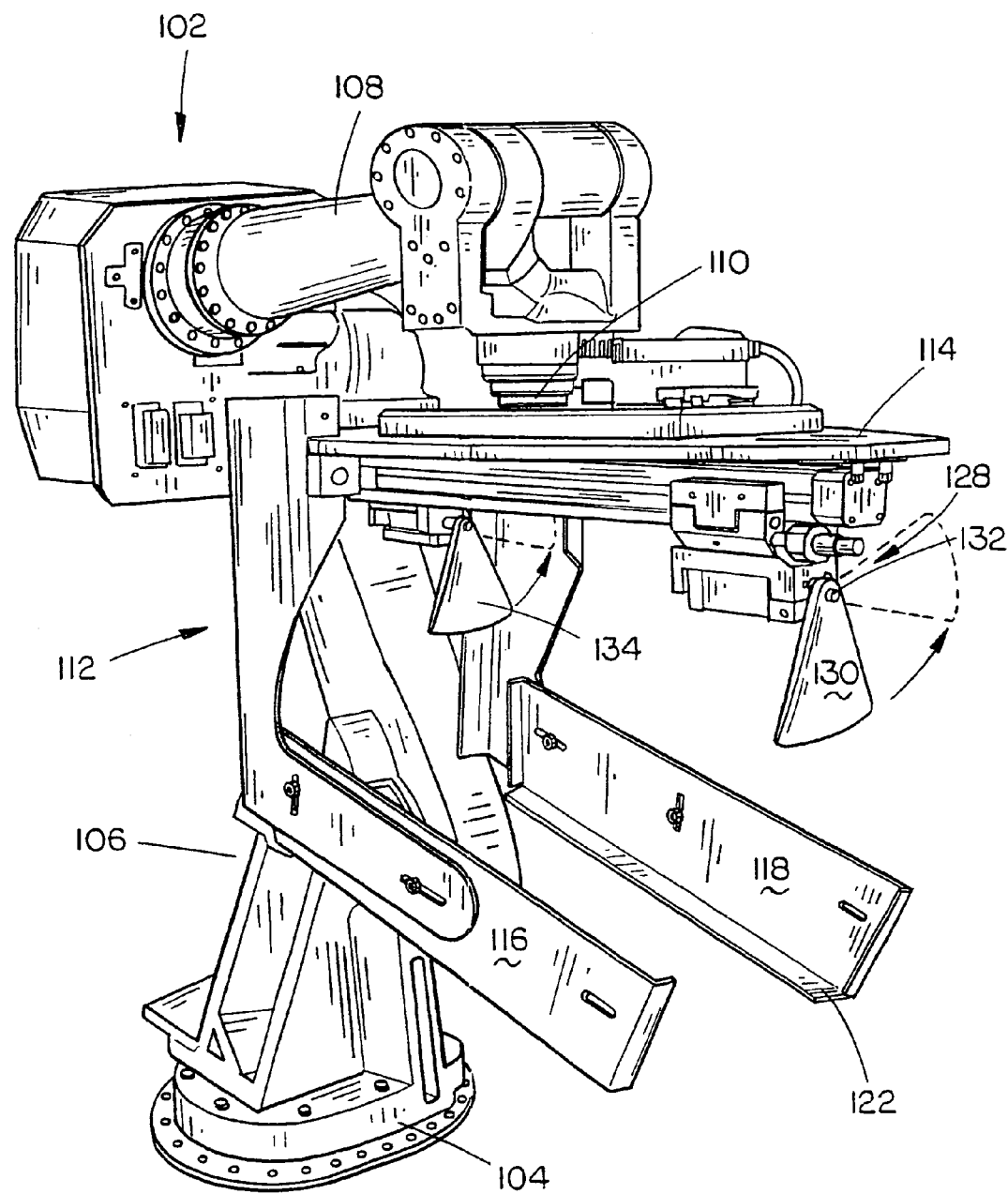
FIG. 8 is a perspective view of the robot, mail support and mail sweeper.
Figure 9:
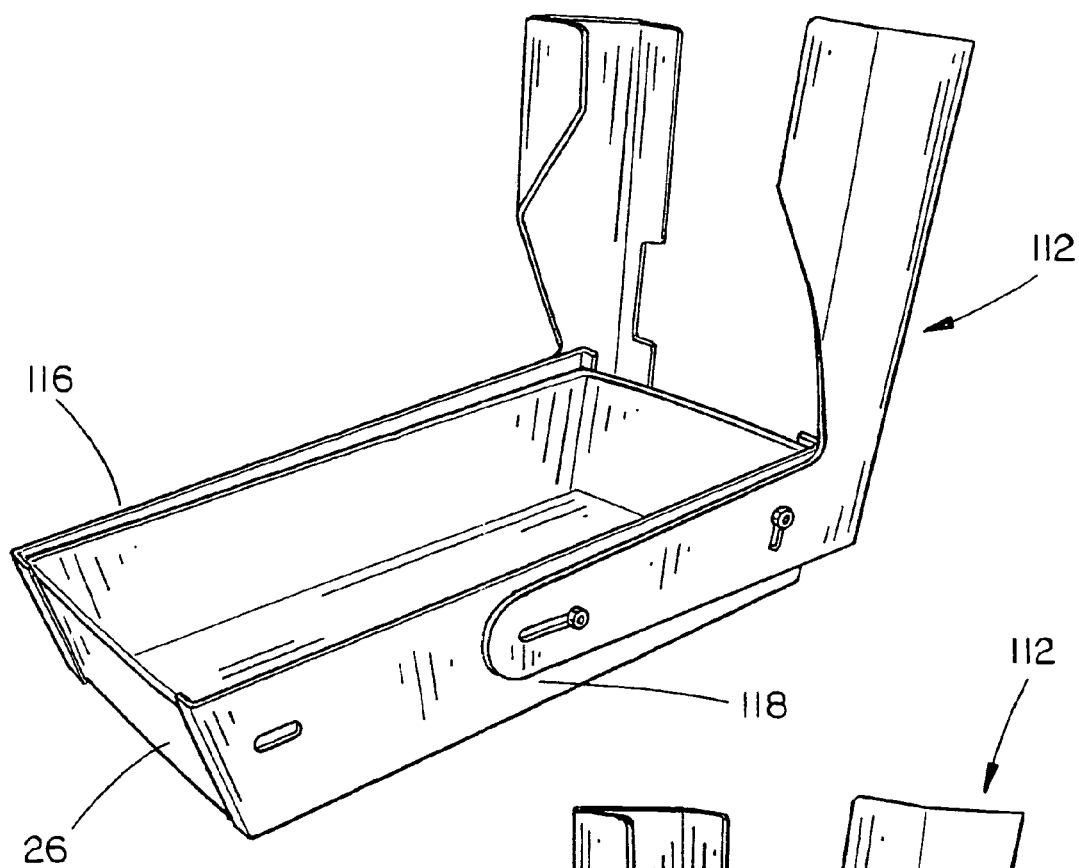
FIG. 9 is a partial perspective view of the mail tray support having a mail tray supported therein.

The robotic portion of the system will now be described. The numeral 102 refers to a conventional robot including a controller and computer or processor of conventional design. Robot 102 includes a base 104 supported upon a floor, a pedestal 106 and a robot or robotic arm 108 including a tip or tool end 110. A mail tray support 112 is pivotally secured to mounting plate 114 by any convenient means so as to be movable therewith and with respect thereto. Support 112 includes a pair of pivotal side members, support members or arms 116 and 118 having inwardly extending flanges 120 and 122 thereon, respectively, which are designed to support a mail tray 26 thereon and therebetween. It should be noted that support 112 is shown to be tilted or canted in FIGS. 1, 2 and 4-7 merely to show both the arms 116 and 118. Normally, the arms 116 and 118 are parallel to one another in the same horizontal plane as seen in FIGS. 8 and 9. The arms 116 and 118 are pivotally movable with respect to each other by means of a pneumatic cylinder secured thereto and extending therebetween. The pneumatic cylinder is designed to enable the arms 116 and 118 to be moved from a closed, tray engaging position to an open, non-tray engaging position.

One or more power cylinders 126, either pneumatic or hydraulic, interconnect support 112 and mounting plate 114 to enable support 112 to be pivotally movable with respect to mounting plate 114 (FIGS. 13-19).

Figure 15:
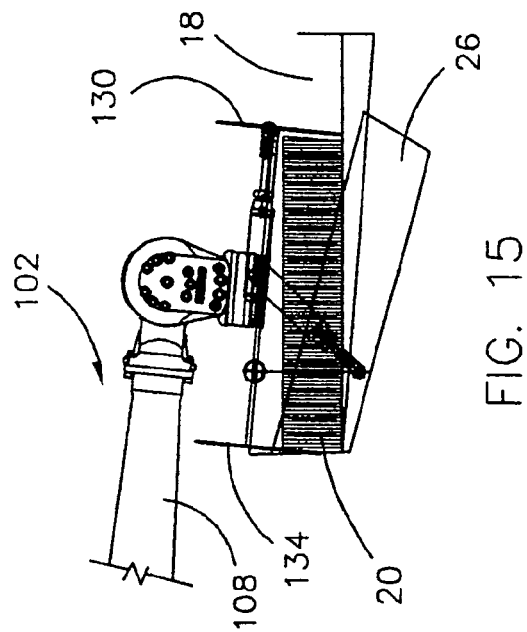
Figure 14:
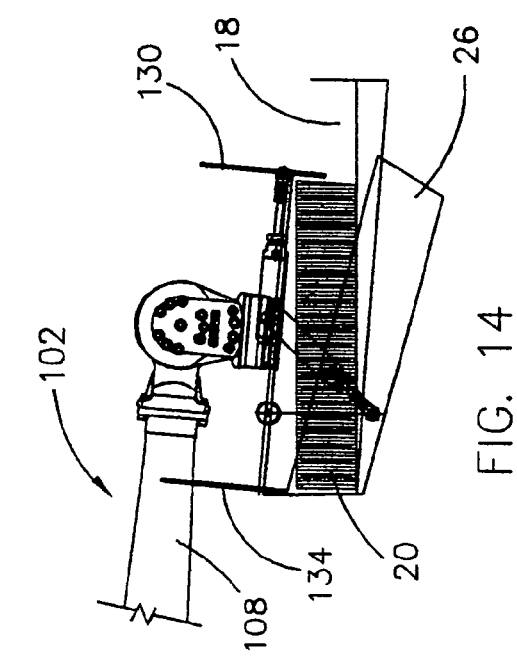
Figure 16:
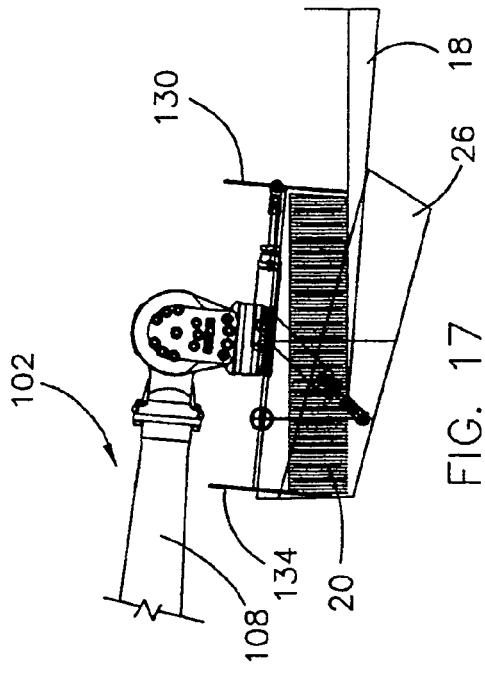
Figure 17:
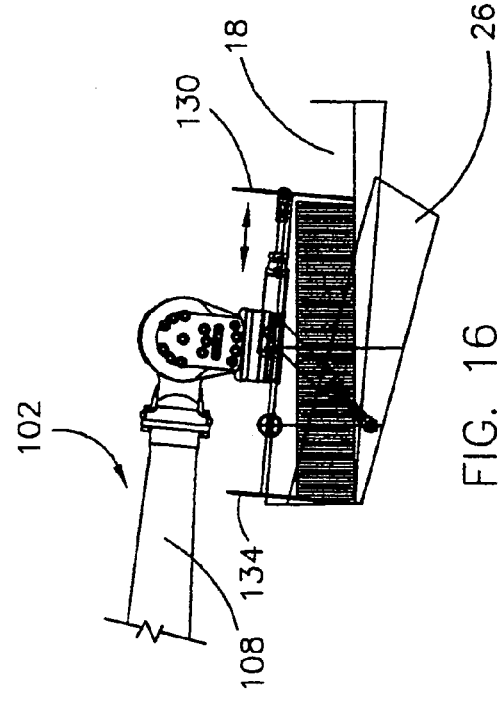
Figure 18:
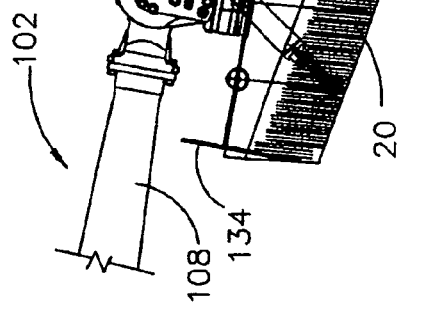
Figure 19:
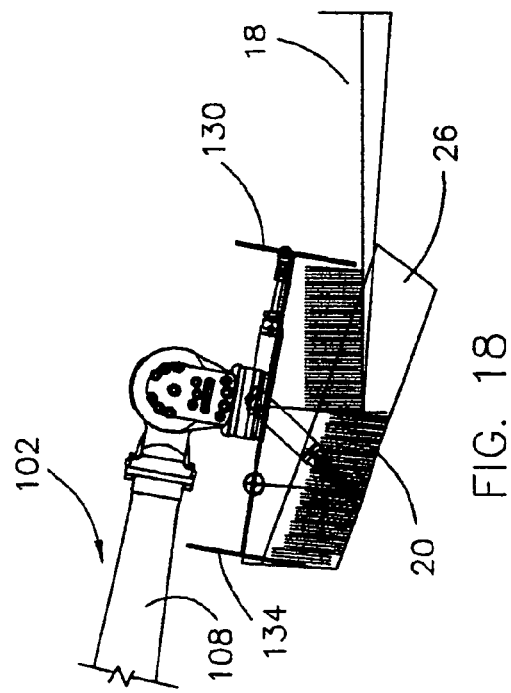
Figure 20:
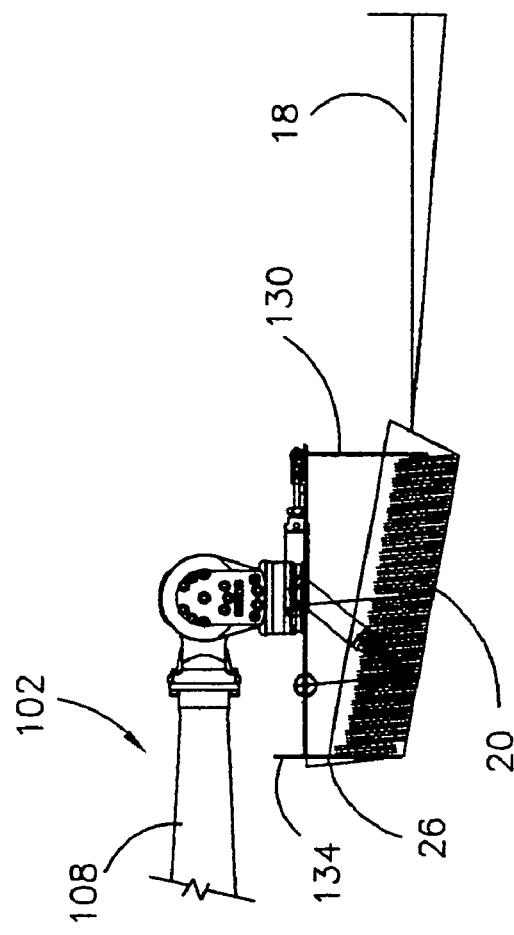
Figure 21:
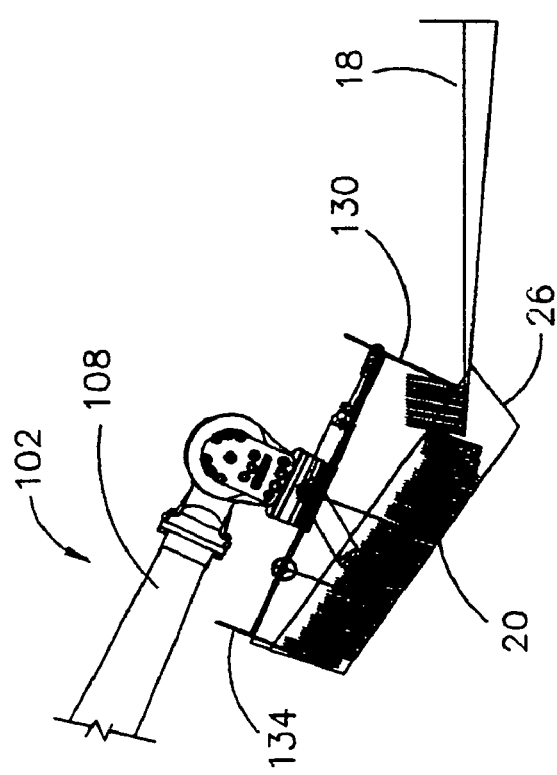

The numeral 128 refers to a mail sweeper assembly which is mounted on mounting plate 114 and which is positioned therebelow. Assembly 128 includes a plate, blade or paddle 130 which is mounted on the end of a rotatable and longitudinally movable shaft 132. Shaft 132 is longitudinally movable between retracted and extended positions, and is rotatably movable between a first, non-envelope engaging position (FIG. 13) and an envelope engaging position (FIG. 15). The shaft 132 is rotatably and longitudinally movable by any convenient means. A second plate, blade or paddle 134 is also rotatably mounted on mounting plate 114 and is rotatable between a first non-envelope engaging position and a second envelope engaging position by any convenient means. As seen, paddle 134 is spaced from paddle 130 so that paddles 130 and 134 may be positioned at the opposite ends of the stack of envelopes in the stacker bin. Although the robot of this invention is ideally suited fro use with the denester assembly previously described, the robot's primary purpose is to tray mail into a mail tray regardless of the manner of supplying and/or denesting empty mail trays for handling by the robot.

Assuming that the denester assembly 24 previously described is being used in combination with the mail tray support 112 and the mail sweeper apparatus 128 at the tool end of the robot and further assuming that an empty mail tray is supported by the mail tray denester apparatus in a position above a stack of mail trays, as illustrated in FIG. 30, the robot 102 is used in the following manner to tray envelopes.

Figure 10:
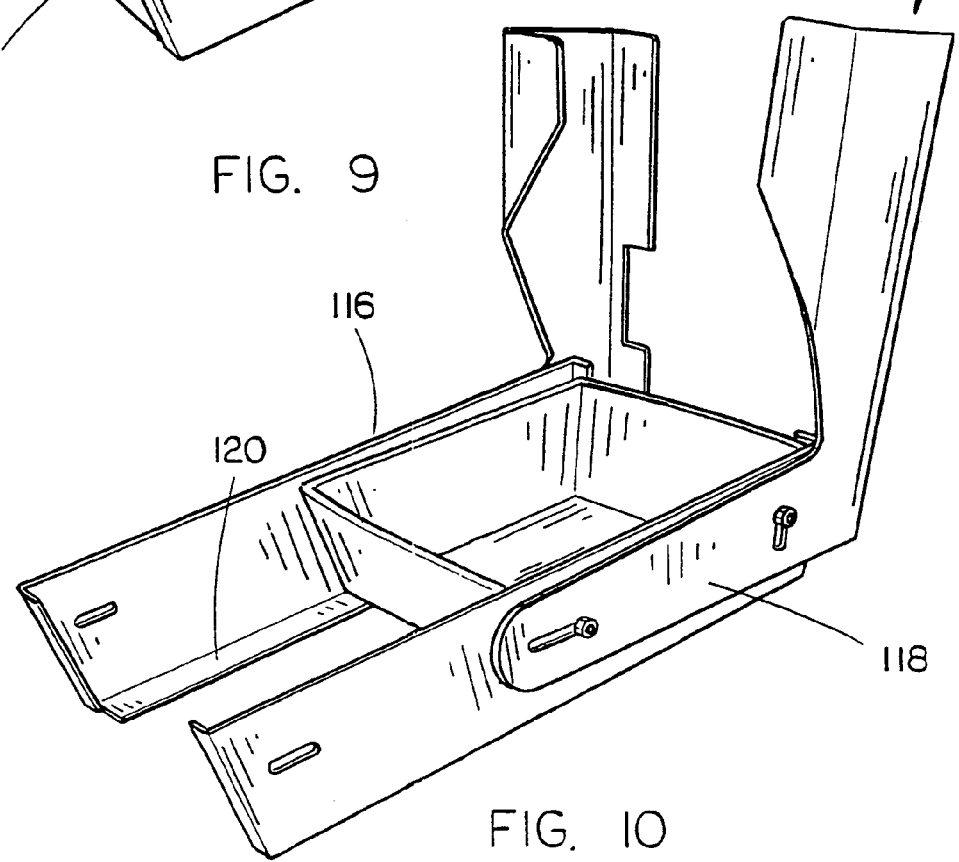
FIG. 10 is a view similar to FIG. 9 except that a smaller mail tray is positioned in the mail tray support.
Figure 11:
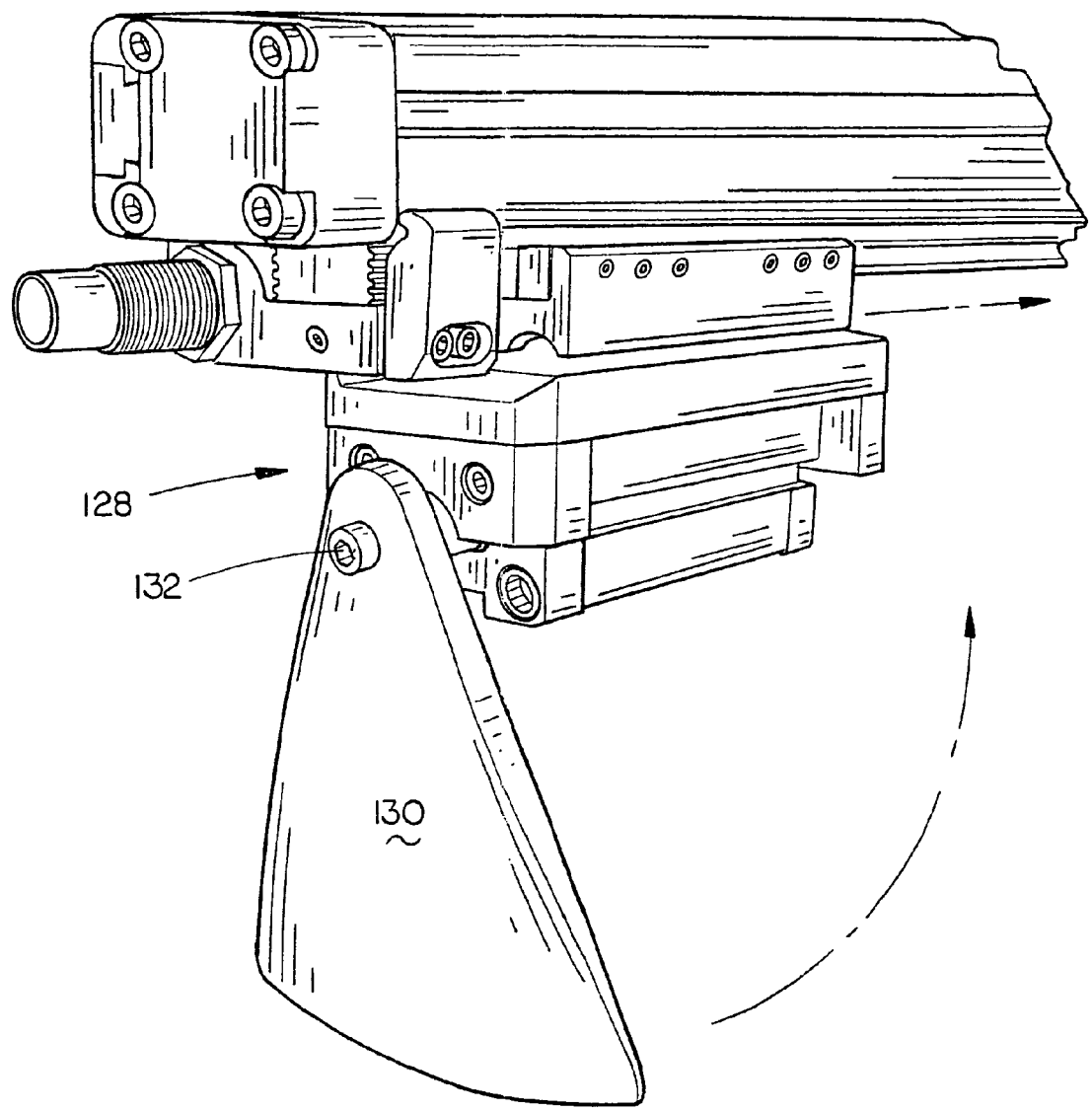
FIG. 11 is a perspective view illustrating a portion of the mail sweeper mechanism.
Figure 22:
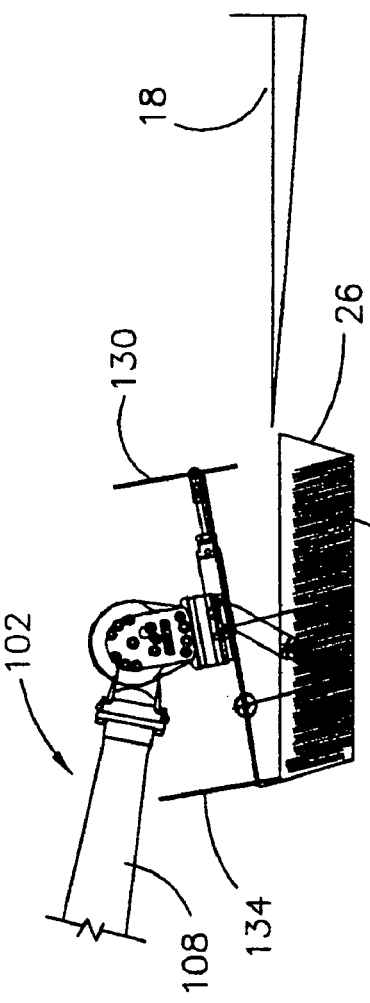
Figures 24, 25:
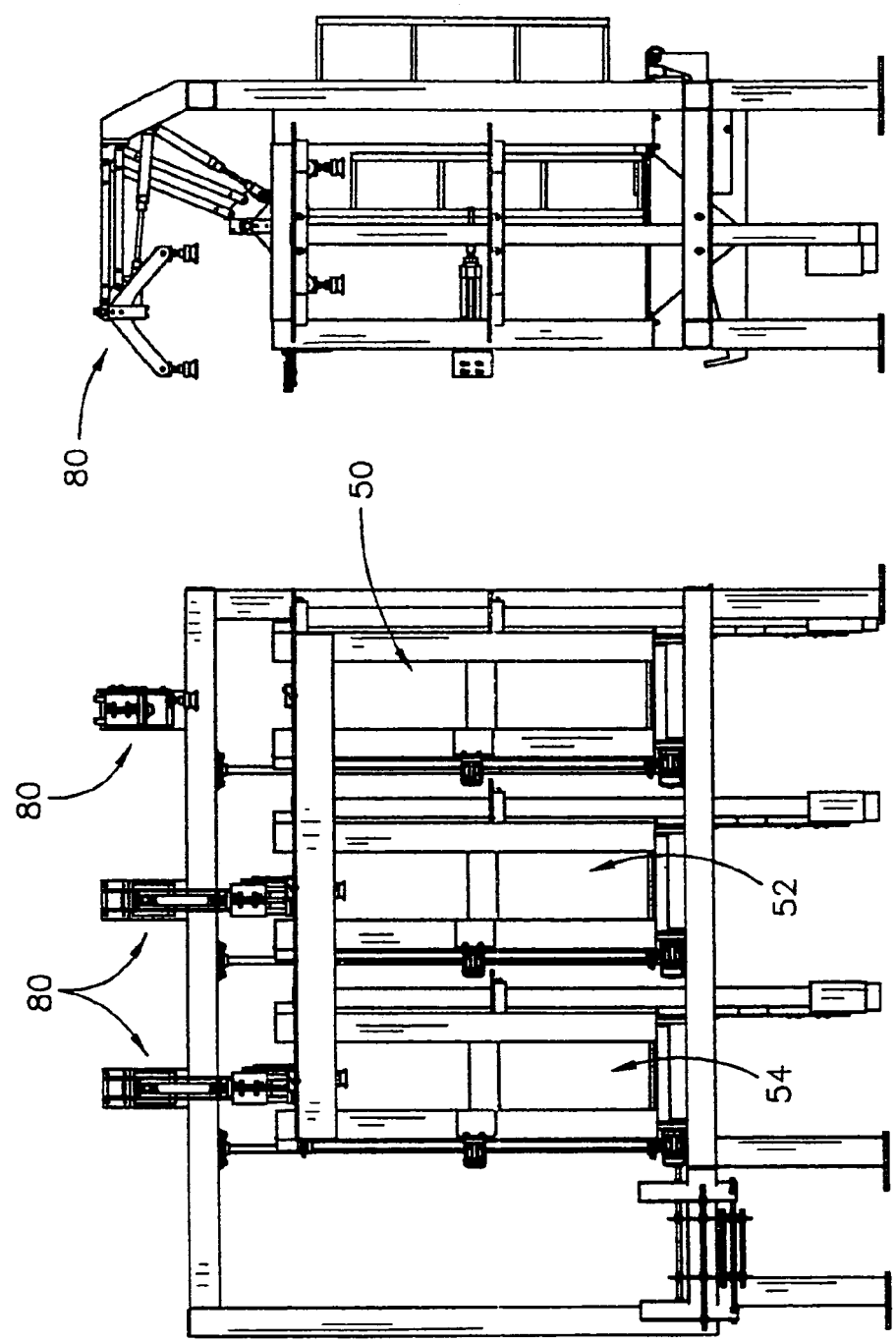
FIG. 24 is a front view of the denester apparatus.
FIG. 25 is a side view of the denester apparatus.
Figure 26:
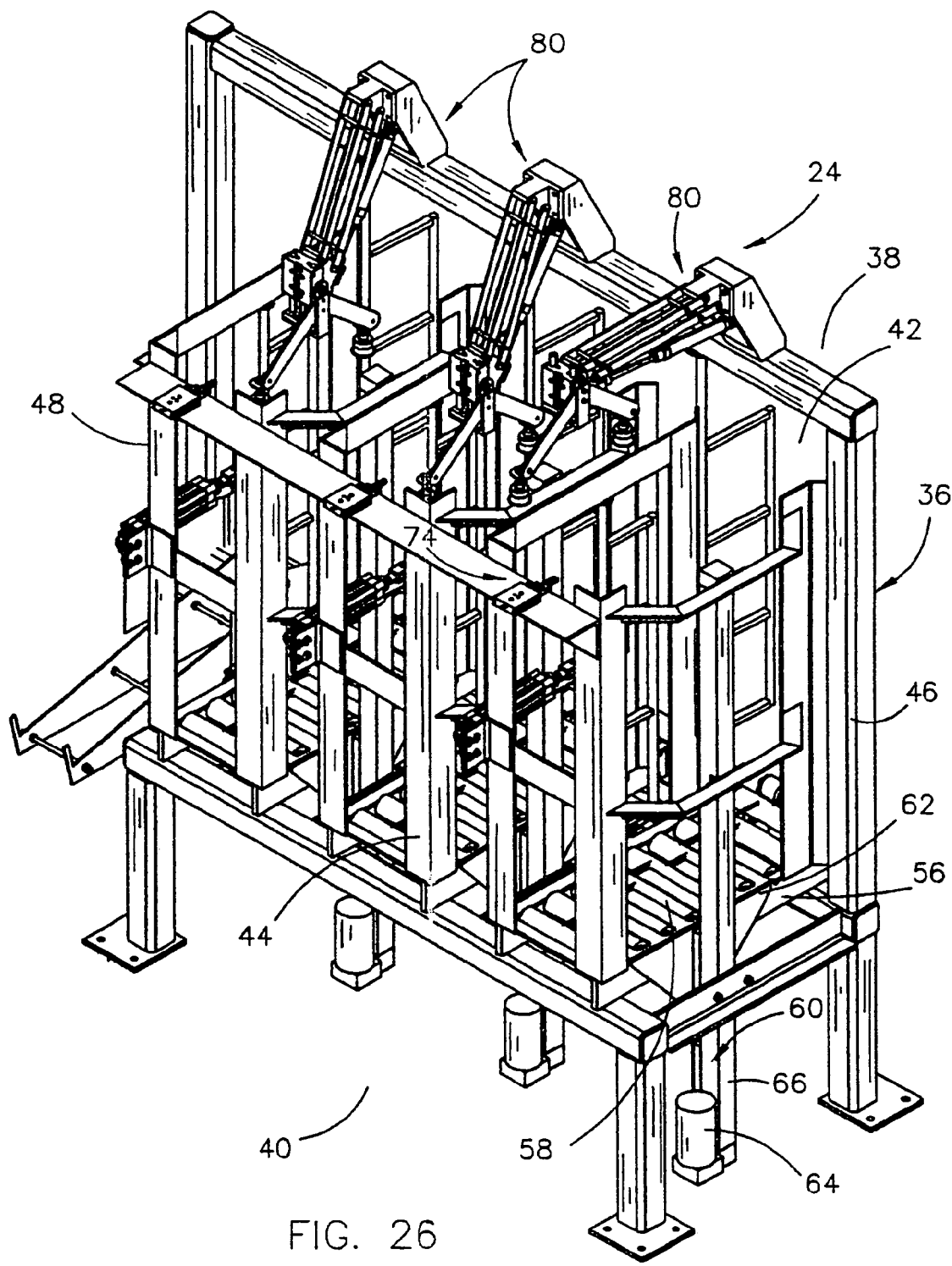
FIG. 26 is a front perspective view of the denester apparatus.
Figure 27:
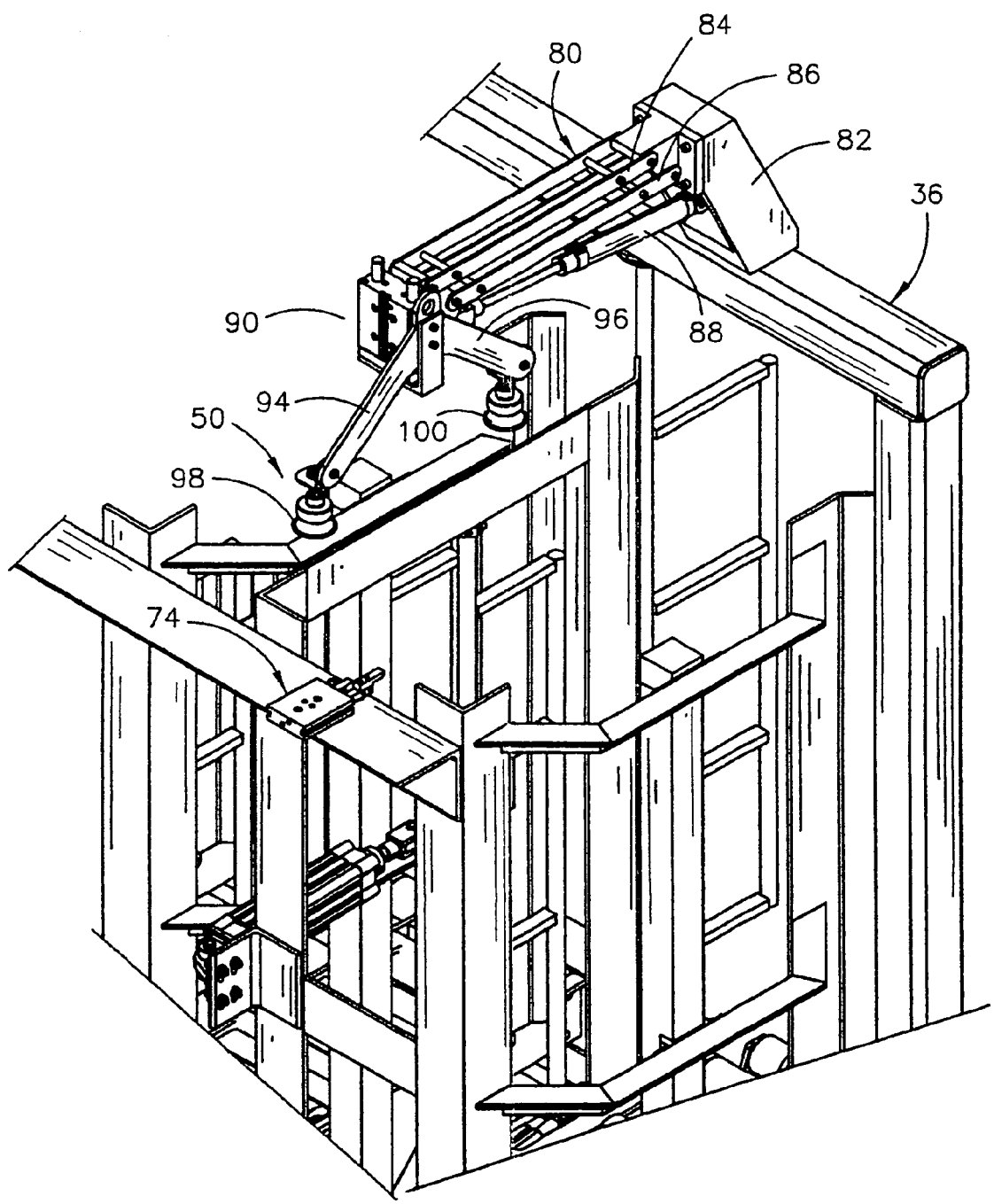
FIG. 27 is a partial perspective view of a portion of the denester apparatus.
Figure 28:
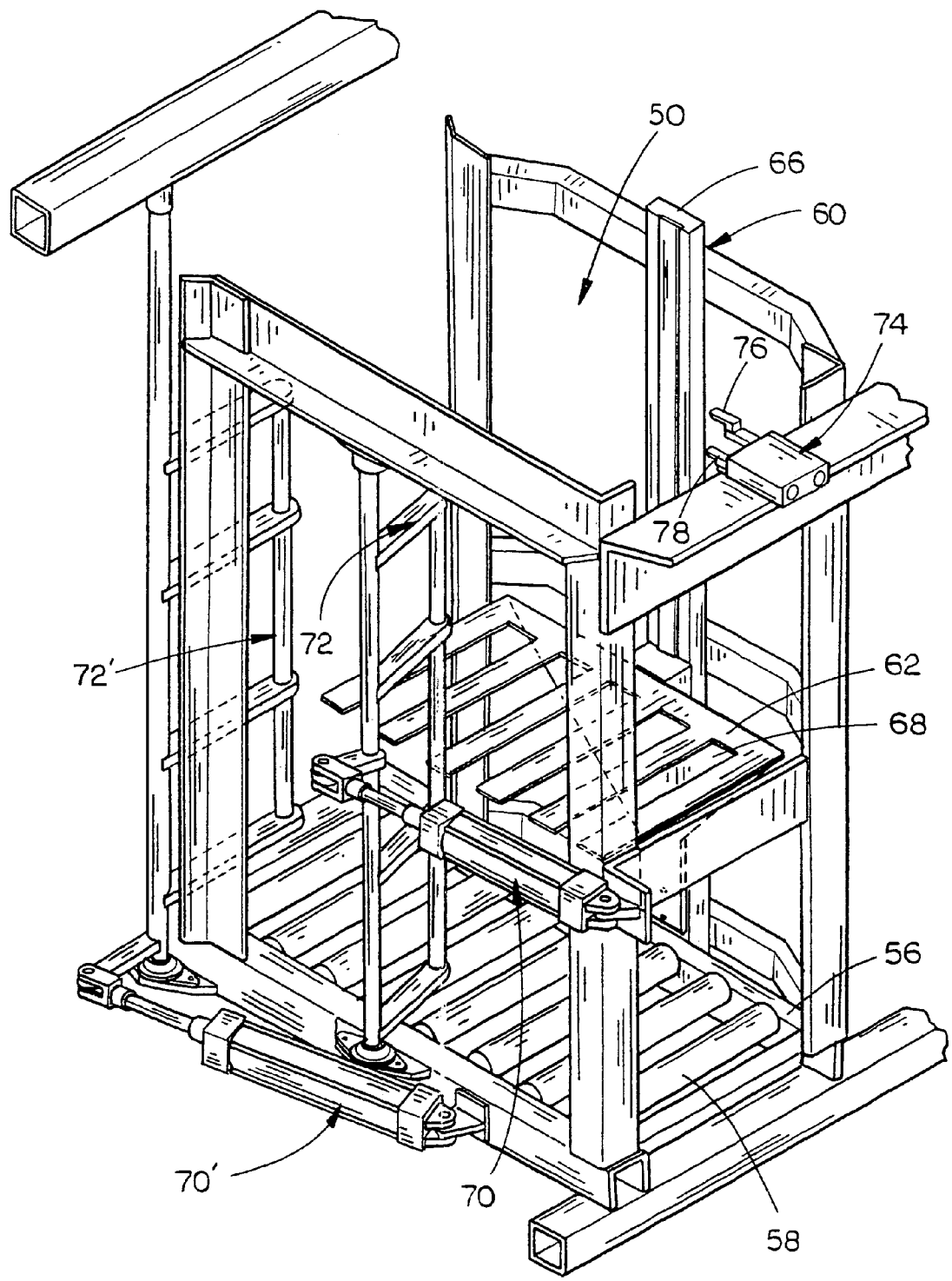
FIG. 28 is a partial perspective view of the denester apparatus.

The mail processor machine or machines stacks envelopes in a stacker bin 18 or bins 18. The robot 102 is actuated to move the support 112, with the arms 116 and 118 being in their open position, towards the suspended empty mail tray 26 so that the arms 116 and 118 are positioned on opposite sides of the empty mail tray 26. The arms 116 and 118 are then closed so that the mail tray is grasped by the arms 116 and 118 and supported on the flanges 120 and 122 thereof. The suction on the cups 98 and 100 is released so that the mail tray is released therefrom. The mail tray support 112 will support a full length mail tray 26 therein, as seen in FIG. 9, or a shorter mail tray 26 therein, as seen in FIG. 10. The robot arm is then moved to the position of FIG. 13. At this time, the paddles 130 and 134 will be in their non-envelope engaging positions and shaft 132 will be in its extended position. The support 112 is then moved from the position of FIG. 13 to the position of FIG. 14. Paddles 130 and 134 are then rotated to their envelope engaging positions (FIG. 15) so that paddle 130 is positioned at one end of the stack of envelopes in the stacker bin and so that paddle 134 is positioned at the other end of the stack of envelopes in the mail stacker bin 18 and so that the mail tray 26 is positioned below the mail stacker bin 18 at the discharge end thereof. The robotic arm 108 and the support 112 are then moved away from the stacker bin, as illustrated in FIGS. 16-21. At the same time that the support 112 is initially moved away from the stacker bin 18, the shaft 132 is retracted. The combined retracted movement of shaft 132 and the mail tray support 112 with respect to the stacker bin 18 causes the paddle 130 to sweep the envelopes into the mail tray 26 in the manner illustrated in FIGS. 16-21. After the envelopes are in the mail tray (FIG. 22), the paddles 130 and 134 are rotated to their non-envelope engaging positions.

The robot arm 108 is then moved into position over the outbound conveyor 136. The support 112 places the filled mail tray onto the conveyor 136 and the arms 116 and 118 are moved to the open position to disengage the support 112 from the mail tray. The process is then repeated. The robot is designed to retrieve empty mail trays from one or more sources and to position the same adjacent any one of many stacker bins, sweep the mail from a stacker bin and then deliver the same to one or more outbound conveyors, all of which is accomplished in a quick fashion without manual assistance.

Thus it can be seen that the invention accomplishes at least all of its stated objectives.

We claim:

1. The method of processing mail envelopes, comprising the steps of:
   (a) providing a mail processing machine including a stacker bin, having infeed and discharge ends, into which mail envelopes are placed in an upstanding position so as to be standing on edge;
   (b) providing a source of empty mail trays remote from the stacker bin;
   (c) providing a robot including a movable robot arm having a mail tray support and mail sweeper secured to the tool end thereof with the robot being positioned relative to the stacker bin and the source of empty mail trays so that the mail tray support and mail sweeper may be moved therebetween by the robot;
   (d) causing the robot arm to move to the source of empty mail trays;
   (e) positioning an empty mail tray in the mail tray support;
   (f) moving the robot arm so that the empty mail tray in the mail tray support thereon is positioned below the stacker bin at the discharge end thereof;
   (g) positioning the mail sweeper relative to the envelopes and moving of the mail tray support away from the stacker bin causing the mail envelopes in the bin to be swept into the mail tray;
   (h) moving the robot arm and the filled mail tray to a mail tray discharge area;
   (i) removing the filled mail tray from the mail tray support; and
   (j) repeating the steps of (d)-(i).

2. The method of claim 1 wherein the mail tray discharge area comprises an outbound discharge conveyor and wherein the robot arm places the filled mail tray onto the outbound discharge conveyor.

3. The method of claim 1 wherein the source of empty mail trays comprises a stack of empty mail trays positioned within one another in a nested relationship.

4. The method of claim 3 wherein a mail tray denester mechanism is associated with the stack of empty mail trays.

5. The method of claim 3 wherein a denester mechanism is provided and wherein the method further includes the step of denesting the uppermost empty mail tray in the stack to enable the uppermost mail tray to be positioned in the mail tray support.

6. The method of claim 1 wherein the source of empty mail trays comprises a plurality of stacks of empty mail trays with the mail trays in each stack being positioned within one another in a nested relationship.

7. The method of claim 6 wherein a denester mechanism is associated with each of the stacks of empty mail trays.

8. The method of claim 1 further includes the step of providing one or more additional mail processing machines and further includes the step of selectively moving the robot arm and mail tray support between the source of empty mail trays and the bins of the mail processing machines.

9. In combination with a mail processing machine including a stacker bin, having infeed and discharge ends, into which mail envelopes are placed in an upstanding position so as to be standing on edge, comprising:
 a robot including a movable robot arm;
 a mail tray support on said robot arm;
 said mail tray support adapted to have a mail tray supported thereon;
 a mail sweeper mechanism on said robot arm;
 said robot adapted to move said robot arm and mail tray support to a position adjacent the discharge end of the stacker bin whereby said mail sweeper mechanism may sweep the mail envelopes in the stacker bin into a mail tray positioned on said mail tray support;
 a mail tray denester assembly positioned remotely of said robot;
 said mail tray denester assembly including:
  (a) an upstanding mail tray receptacle having upper and lower ends;
  (b) said lower end of said mail tray receptacle being in communication with a source of empty mail trays;
  (c) a vertically movable tray support positioned within said mail tray receptacle and being selectively movable from a first lower position to a second raised position;
  (d) said mail tray receptacle adapted to have a plurality of empty stacked mail trays positioned therein in a nested condition with respect to one another on said tray support;
  (e) a tray lift mechanism at the upper end of said mail tray receptacle which is adapted to lift the uppermost mail tray in said mail tray receptacle to a position spaced above the remaining mail trays in the receptacle whereby said uppermost mail tray is separated from the remaining mail trays for further handling;
 said robot arm being movable to a position adjacent the lifted uppermost tray in said mail tray receptacle whereby said uppermost tray may be positioned in said mail tray support for movement to said stacker bin.

10. The combination of claim 9 further comprising a tray engagement apparatus which is adapted to engage the mail tray immediately below the uppermost tray so that the empty mail trays positioned below the uppermost empty mail tray will be held in position as the uppermost empty mail tray is raised to its said position above the remaining empty mail trays.

11. The combination of claim 10 wherein said tray engagement means comprises a substantially horizontally movable plunger mounted on said mail tray receptacle.

12. The combination of claim 9 wherein said tray lift mechanism comprises a vacuum lifter which is movable into engagement with the said uppermost tray.

13. In combination:
 a mail processing machine including a stacker bin, having infeed and discharge ends, into which mail envelopes are placed in an upstanding position so as to be standing on edge;
 a robot including a support having an elongated robotic arm, having inner and outer ends, extending therefrom;
 said robotic arm being vertically movable with respect to said support;
 said robotic arm being rotatable about a vertical axis with respect to said support;
 said outer end of said robotic arm being movable towards and away from said support;
 a mail tray support selectively pivotally secured to the outer end of said robotic arm about a horizontal axis transverse to the longitudinal axis of said robotic arm;
 said mail tray support adapted to have a mail tray supported thereon;
 a mail sweeper mechanism on said robotic arm;
 said robot adapted to move said robotic arm and said mail tray support to a position adjacent the discharge end of said stacker bin whereby said mail sweeper mechanism may sweep the mail envelopes in said stacker bin into the mail tray positioned on said mail tray support.

14. The combination of claim 13 wherein said mail sweeper includes a first plate which is rotatably movable between first and second positions with respect to said mail tray support.

15. The combination of claim 14 wherein said first plate is also longitudinally movable with respect to said mail tray support.

16. The combination of claim 14 wherein said first plate, when in its said first position, being in a non-engagement mode with respect to the envelopes.

17. The combination of claim 16 wherein said first plate, when in its said second position, being in an engagement position with respect to the envelopes in the bin.

18. The combination of claim 17 wherein said mail sweeper also includes a second plate which is spaced from said first plate and which is movable between first and second positions.

19. The combination of claim 18 wherein said second plate, when in its said first position, being in a non-engagement mode with respect to the envelopes.

20. The combination of claim 19 wherein said second plate, when in its said second position, engaging one end of the stacked envelopes.

21. The combination of claim 20 wherein said first plate, when in its said second position, engages one end of the stacked envelopes and said second plate, when in its said second position, engaging the other end of the stacked envelopes.

* * * * *